US011880026B2

(12) United States Patent
Anhut et al.

(10) Patent No.: US 11,880,026 B2
(45) Date of Patent: Jan. 23, 2024

(54) MICROSCOPE AND METHOD FOR LIGHT-FIELD MICROSCOPY WITH LIGHT-SHEET EXCITATION AND FOR CONFOCAL MICROSCOPY

(71) Applicant: CARL ZEISS MICROSCOPY GMBH, Jena (DE)

(72) Inventors: Tiemo Anhut, Jena (DE); Daniel Schwedt, Jena (DE); Matthias Wald, Jena (DE); Thomas Mehner, Kleinromstedt (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 192 days.

(21) Appl. No.: 17/453,075

(22) Filed: Nov. 1, 2021

(65) Prior Publication Data

US 2022/0137384 A1 May 5, 2022

(30) Foreign Application Priority Data

Nov. 1, 2020 (DE) ..................... 10 2020 213 714.5

(51) Int. Cl.
*G02B 21/00* (2006.01)
*G02B 21/06* (2006.01)
*G02B 21/36* (2006.01)

(52) U.S. Cl.
CPC ......... *G02B 21/0032* (2013.01); *G02B 21/06* (2013.01); *G02B 21/367* (2013.01)

(58) Field of Classification Search
CPC .. G02B 21/0032; G02B 21/06; G02B 21/367; G02B 21/00; G02B 21/0004;
(Continued)

(56) References Cited

U.S. PATENT DOCUMENTS 9,030,734 B2 5/2015 Knebel et al.
10,031,325 B2 7/2018 Anhut et al.
(Continued)

FOREIGN PATENT DOCUMENTS

DE 102011000835 B4 4/2014
DE 102014102215 A1 8/2015
(Continued)

OTHER PUBLICATIONS

Cong, Lin , et al., "Rapid whole brain imaging of neural activity in freely behaving larval zebrafish (Danio rerio)", eLife, Neuroscience, Tools and Resources (https://elifesciences.org/articles/28158), Sep. 20, 2017, 20 pages.

(Continued)

*Primary Examiner* — Arnel C Lavarias

(74) *Attorney, Agent, or Firm* — Brake Hughes Bellermann LLP

(57) ABSTRACT

A microscope, which includes a color splitter that is reflective to excitation radiation, can switch between a first and a second operating mode. A first apparatus can introduce a first cylindrical optical element into the excitation beam path between a light source and the color splitter, when the microscope is in the first operating mode, and a second apparatus can introduce a second cylindrical optical element into the excitation beam path between the color splitter and a scanning apparatus.

12 Claims, 4 Drawing Sheets

(58) Field of Classification Search

CPC .............. G02B 21/002; G02B 21/0024; G02B 21/0036; G02B 21/0048; G02B 21/0052; G02B 21/006; G02B 21/0076; G02B 21/36; G02B 21/361; G02B 21/365

USPC ....... 359/385, 362, 363, 368, 369, 381, 388, 359/390, 433

See application file for complete search history.

(56) References Cited

U.S. PATENT DOCUMENTS

| | | | | |
|---|---|---|---|---|
| 2017/0153433 | A1* | 6/2017 | Kubo ................. | G02B 27/0068 |
| 2018/0284411 | A1 | 10/2018 | Dohi et al. | |
| 2019/0196172 | A1 | 6/2019 | Hillman | |
| 2019/0250387 | A1 | 8/2019 | Schumann | |
| 2019/0317312 | A1* | 10/2019 | Hillman ............... | G02B 21/367 |

FOREIGN PATENT DOCUMENTS

| | | | |
|---|---|---|---|
| DE | 102016011227 | B3 | 12/2017 |
| DE | 102019119147 | A1 * | 1/2021 |
| WO | 2017147528 | A1 | 8/2017 |

OTHER PUBLICATIONS

Truong, Thai V., et al., "High-contrast, synchronous volumetric imaging with selective volume illumination microscopy", Communications Biology; 3:74; (https://www.nature.com/articles/s42003-020-0787-6), 2020, 8 pages.

European Search Report for Application No. 21204992.8, dated Mar. 28, 2022, 7 pages.

Nguyen, et al., "Single-Objective Multiphoton Light-Sheet Microscopy for Tumor Organoid Screening", Progress in Biomedical Optics and Imaging, SPIE—International Society for Optical Engineering; vol. 10882, Feb. 22, 2019, 10 pages.

* cited by examiner

MICROSCOPE AND METHOD FOR LIGHT-FIELD MICROSCOPY WITH LIGHT-SHEET EXCITATION AND FOR CONFOCAL MICROSCOPY

CROSS REFERENCE TO RELATED APPLICATION

This application claims priority, under 35 U.S.C. Section 119, to German Application No. 10 2020 213 714.5, filed Nov. 1, 2020, the disclosure of which is incorporated herein by reference in its entirety.

TECHNICAL FIELD

The invention relates to a microscope, and to a method for operating a microscope, for light-field microscopy with light-sheet excitation and for confocal microscopy.

SUMMARY

Modern microscopy increasingly focuses on the fast capturing of three-dimensional sample volumes. An essential application in this case is the measurement of neural signals in networks of nerve cells. These networks are spread out in the brain over several hundred or thousand micrometres. To be able to understand essential capabilities of the brain, reactions of said networks or of large portions thereof need to be captured as completely as possible with a high temporal resolution. Since it is not only the understanding of the morphological structure but also functional processes that are important here, these methods are also combined under the keyword functional imaging.

In the field of microscopy, a number of different methods are known with which it is possible to approximate functional imaging. Method-based approaches, for example, fast, axially scanned 2D recording, are generally too slow for the field of application outlined above. Methods that are directed purely towards algorithmic evaluation (computational imaging) are generally susceptible to artifacts.

Confocal scanning methods with a low degree of parallelization have the disadvantage that they operate relatively slowly and in a time-sequential manner. Increasing the speed is often associated with an increase in the luminous power in the sample, wherein a higher luminous power can saturate fluorescent markers that are used and damage the sample. A further point-scanning method is multiphoton microscopy. The degree of parallelization in that case is also low.

Increased parallelization is possible for example by means of spinning disk microscopy. In this case, a relatively large number of scanning beams are guided simultaneously over a sample and the respectively brought-about detection radiation through what are known as pinholes, which are located in a rotating disk, is captured. This confocal method allows for example the parallel scanning of a few hundred focal volumes.

Methods and arrangements that use what is known as light-sheet illumination likewise exhibit a relatively high degree of parallelization. For this purpose, a static or dynamic light sheet is generated and directed into the sample. Due to the very low thickness (light-sheet thickness) of the light sheet transversely to its two-dimensional extent, detection radiation, in particular fluorescent radiation, is brought about only in a currently illuminated plane.

Alternatively to selective illumination of regions of the sample, widefield illumination is used when light-field microscopy is applied. Detection in accordance with light-field technology permits fast capturing of data within, in terms of microscopy, larger volumes and good depth resolution. The disadvantages lie in the lack of a possibility of optical sectioning and in strong background radiation.

Capturing a relatively large volume with simultaneously improved resolution can be achieved by using a microlens array upstream of the detector. In the publication Cong et al. (Cong, L. et al. 2017; eLife, 6:e28158), a microlens array is proposed herefor, in which microlenses of different focal lengths are arranged. However, it is a disadvantage that only a part of the aperture is used by each of the microlens groups.

The method of light-field imaging in the form of Fourier integral microscopy uses a microlens array arranged in a pupil plane of the microscope. A multiplicity of imaged presentations of the sample space appear in the focal plane of the microlens array. The focal plane of each individual microlens is here conjugated to the same object plane. In the simplest case, the detector used for image recording is located in this intermediate image plane. This refinement of light-field microscopy will also be referred to below as light-field imaging in the Fourier domain.

Imaging by means of light-field microscopy aims to capture a spatial structure (3D structure) of the sample with only one recording. For this purpose, the imaged presentations brought about by the microlens array are computationally combined. Each of said imaged presentations shows the same sample but at different angles, with the result that different planes within the depth of field of these imaged presentations can be presented sharply, for example using a simple "shift-and-add" algorithm. Owing to the reduced numerical aperture (NA) per imaging channel, the lateral resolution is significantly limited, but in return the resolution of the axial structure of the sample volume increases.

If light-field microscopy technology is combined with widefield illumination, the contrast is significantly reduced owing to out-of-focus object structures. To illuminate a large volume and additionally also achieve imaging with a high contrast, the sample can be illuminated with a light sheet that is thicker than is typically the case in light-sheet microscopy (selective plane illumination microscopy; SPIM). The advantage of a thick light sheet is that only the sample volume that is to be imaged is illuminated. Regions that are not illuminated by the thick light sheet do not have a contrast-reducing effect (Truong, T. V. et al., (2020), Commun Biol 3: 74).

It is known from the prior art that, for radiating in the thick light sheet in an inclined fashion, an objective used together for illumination and detection can be used. In addition to illumination, the common objective also allows the collimation of radiation to be detected from the sample. With such a technical solution, the outlay in terms of equipment is contained and the production costs of the device are limited (e.g. DE 10 2014 102 215 A1, DE 10 2011 000 835 B4).

A further embodiment of a microscope is known from DE 10 2016 011 227 B3. The latter describes a microscope system that can be switched between two operating modes. The microscope system comprises a light-sheet microscopy functional unit, which illuminates and images a sample in a first operating state of the microscope system by means of a light-sheet-type illumination-light distribution. Furthermore present is a scanning-microscopy functional unit, which illuminates and images the sample in a second operating state of the microscope system by means of a point-type illumination-light distribution. A control unit serves for switching between the first operating state and the second operating state.

This disclosure proposes a flexible option for imaging a sample by means of light-field technology, which in particular permits the use of a further microscopy method. This disclosure furthermore proposes a method for operating a microscope with a wide variety of possible uses.

The microscope has an excitation beam path, in which a light source, in particular a laser light source, for providing excitation radiation is present. The excitation beam path furthermore includes a scanning apparatus by means of which the reflected excitation radiation can be deflected in a controlled manner, and an objective for illuminating a sample with the excitation radiation and for capturing detection radiation brought about by means of the excitation radiation, and means for switching between a first operating mode of the microscope and a second operating mode of the microscope.

The microscope is characterized in that a color splitter is arranged in the excitation beam path, which color splitter is reflective to the excitation radiation and through the effect of which a beam of the excitation radiation is reflected along the further excitation beam path. Furthermore located in the excitation beam path between the light source and the color splitter is a first apparatus for introducing optical elements into the excitation beam path, wherein a first cylindrical optical element can be introduced into the excitation beam path by means of the first apparatus in a first operating state of the microscope. Also located in the excitation beam path between the color splitter and the scanning apparatus is a second apparatus for introducing optical elements into the excitation beam path, wherein a second cylindrical optical element can be introduced into the excitation beam path by means of the second apparatus in the first operating state of the microscope.

The first or second cylindrical optical element can be introduced, for example, by being pivoted or pushed into the excitation beam path. In the second operating mode, the first and the second cylindrical optical element are removed from the excitation beam path. To make it possible for the relevant cylindrical optical elements to be pivoted or pushed in or pulled out, the first apparatus and the second apparatus are embodied, for example, in the form of a wheel or a turret with different positions for receiving optical elements, such as filters, the cylindrical optical element, or the possibility of a free path for the excitation radiation. In further embodiments, the first and/or the second apparatus can also be implemented in the form of a slider or a magazine.

Owing to the effect of the first cylindrical optical element, a beam of the excitation radiation is limited in terms of its cross section transversely to the propagation direction of the excitation radiation, that is to say transversely to the optical axis of the microscope, in a first direction. In this way, a thickness of a light sheet to be generated is coarsely set.

A settable stop can furthermore be present in the excitation beam path between the first apparatus for introducing optical elements into the excitation beam path (in the following text: first apparatus, for short) and the color splitter. Such a settable stop serves for finely setting the thickness of a light sheet to be generated. The settable stop can be embodied for example in the form of a turret wheel having a multiplicity of positions for receiving stops with different apertures. In a further refinement, the settable stop is a slit stop of variable size. The stop can also be a displaceable magazine or a material strip with apertures of different sizes. The strip with the apertures can be displaced, for example, transversely to the excitation beam path.

To illustrate the settings of thickness and width of a light sheet, the following values are given as examples: When the stop is open, the width of the light sheet is approximately 3 mm, which corresponds to almost a fifth of a field of view that is scannable using a laser scanning microscope (LSM). The thickness of the light sheet is approximately 0.7 mm in the intermediate image (ZB) of the microscope. The stop can be used to reduce the light-sheet thickness. For example, using a slit width of 1 mm gives a light-sheet thickness in the intermediate image of approximately 0.32 mm with an efficiency of approximately 40%. The limitation with respect to the field scanning with the achieved light-sheet width is determined by the distances, which are fixed in the design of the LSM, between the position of the second cylindrical optical element and a plane conjugated to the objective pupil (entry pupil) in the scanner space. In alternative configurations of the device design, such a limitation may be dispensed with. For example, the second cylindrical optical element, in particular a cylindrical lens, can have a shortened focal length, with the result that focusing is effected into the scanner plane with a larger NA. Focusing can be effected here such that a fifth, a quarter, a third, half or the entire field is scanned with the achieved light-sheet thickness, for example.

The excitation radiation reflected by the color splitter is shaped, in the first operating mode, by means of the second cylindrical optical element by way of said excitation radiation being extended, i.e., widened, in terms of its cross section transversely to the propagation direction of the excitation radiation in a second direction, which is orthogonal to the first direction. In other words, a width of the light sheet to be generated is set by means of the second cylindrical optical element. The excitation radiation shaped in this way in two directions is radiated into an image-side entry pupil of an objective in a manner not on the optical axis and, consequently, an oblique light sheet is generated in an object-side sample space. The excitation radiation brings about detection radiation in a sample that is located in the sample space, which detection radiation is collected by means of the objective.

In one possible embodiment of the invention, the color splitter and the second apparatus for introducing elements into the excitation beam path (in the following text: second apparatus, for short) can in each case be main color splitters. For example, the color splitter can be an RGB main color splitter (RGB=red, green, blue) and the second apparatus can be what is known as an invis main color splitter (invis=invisible; wavelengths that are not part of the visible light).

Detection radiation is understood to mean radiation that is brought about in the sample by the effect of the excitation radiation. The effect of the excitation radiation can, in particular, bring about fluorescent radiation, which is captured as detection radiation. The sample, or regions or structures thereof, can be provided to this end with excitable fluorescence markers.

In an example implementation, an, advantageously settable, reflective element, such as a mirror that is manually or automatically adjustable, can be arranged, upstream of the color splitter, in the excitation beam path. Owing to its effect, the excitation radiation is directed onto the color splitter. The settable reflective element permits a correction of a focal position of the excitation radiation in a pupil plane, in particular, in an entry pupil of the objective. It is thus possible by means of the adjustable mirror to perform fine-setting of an inclination angle of the light sheet with respect to the optical axis of the objective. Such a correction may be necessary if, for example, an objective change has taken place and a boundary of the pupil aperture that has changed because of it is to be compensated. The option of changing the objective is one of the advantages of light-field microscopy, which differs in this respect, among others, from methods such as SCAPE (swept confocally-aligned planar excitation) or OPM (oblique plane microscopy). The use of different microscopy objectives is possible without changing the arrangement of the apparatus, in particular, if the pupil size is approximately the same size. It is advantageously possible to use objectives whose M/NA ratio is the same (e.g., 40×/1.2 NA; 20×/0.6 NA, 10×/0.3 NA). This makes observation of volumes of different sizes with respectively somewhat different resolutions possible.

Since the color splitter is used in reflection, it is very suitable for setting a desired inclination of the light sheet to be generated. For this purpose, the color splitter has a mirror inclined by a tilt angle. The tilt angle of the mirror results in a deviation of the beam of the reflected excitation radiation from the optical axis. A focus of the reflected excitation radiation brought about by the effect of the first and second cylindrical optical elements in the (entry) pupil is displaced towards the periphery of the entry pupil as a result of the deviation from the optical axis. As a consequence of this displacement, the shaped excitation radiation is radiated into the entry pupil off the optical axis, which results in a light sheet that is inclined with respect to the optical axis in an object-side sample space. The tilt angle is ±0.5°, for example.

In another example implementation, two or more positions of the first apparatus can be occupied by mirrors that are tilted into different directions by 0.5°, for example. This makes it possible to change the orientation of the light sheet to be generated in the sample space, with the result that an entire sample volume can be scanned by means of the differently oriented light sheets. The data generated with different illumination directions are advantageously combined. Therefore, this is important in particular because partial images whose viewing direction is oriented along the light sheet contribute only very little information content to a subsequent calculation of the image data, but produce an undesired background signal. In this way, the contribution of the lenses can be excluded whenever the difference between the inclination angle of the light sheet and the viewing angle of the microlens is small, for example smaller than 10°.

To capture the detection radiation captured in the first operating mode of the microscope, a first detection path is present in a detection beam path of the microscope. A first detector having an upstream microlens array with a number of microlenses is present in the first detection path, wherein each microlens is optically assigned a number of detector elements of the first detector, with the result that, in addition to a piece of spatial information of the origin of the detection radiation, a plurality of pieces of angle information of the detection radiation can also be captured.

The microlens array is preferably located in a pupil upstream of the detector. The detector itself, in particular, the detector surface thereof having a number of detector elements, is arranged in an image plane of the microlens array.

In a further example implementation of the microscope, the microlens array is arranged in a nominal image plane and images the detection radiation onto the detector elements of the first detector. In the first operating mode, the microscope is therefore optionally usable for light-field detection both in the spatial domain and also in the Fourier domain.

In an example implementation, the detection radiation can be steered out of the excitation beam path downstream of the objective, in which case the detection radiation does not pass through the second apparatus, the color splitter and any scanning apparatus that may be present. The deflection can be effected by means of a dichroic mirror or a beam splitter, which can additionally be controllable and be moved, depending on the operating mode, into or out of the (excitation) beam path. This embodiment allows retrofitting, for example, of an existing microscope, without the need to elaborately adapt the optical elements of the excitation beam path.

A microscope according an example implementation has a scanning apparatus in the excitation beam path. The reflected excitation radiation can be deflected in a controlled manner by means of the scanning apparatus. In the first operating mode, the generated light sheet can be pushed through the sample space and correspondingly through a sample located therein. As a result, a sample can be scanned in its entirety or in part by means of the light sheet. In the second operating mode, the scanning apparatus is used to steer the reflected excitation radiation into the entry pupil of the objective, which serves as the illumination objective and the detection objective, and to scan a sample located in the sample space in particular using a light spot (focus) in the further course.

In a further example implementation, an optical zoom may be present between the color splitter and the scanning apparatus.

To operate the microscope alternatively in the first operating mode or in the second operating mode, means for switching between the two operating modes are present. These include the first and the second apparatus for introducing cylindrical optical elements, and, if appropriate, their controllable drives, optionally a color splitter that is adjustable in a controlled manner, and a switching element, by means of which a selection can be made between a first detection path and a second detection path in a detection beam path and the captured detection radiation can be steered accordingly into the respectively selected detection path. A switching element is, for example, a folding mirror, or a filter wheel equipped with different dichroic beam splitters or the like.

The process of switching between the operating modes and optionally controlling the light source takes place using control commands generated by a control unit. Said control unit is, for example, a computer, which is connected to the technical elements to be controlled in a manner suitable for transmitting data. The first and the second detector can likewise be connected to the control unit and/or to an evaluation unit for the transmission of data. For example, the control unit can be configured to match the light-field detection to a currently present illumination state, for example a current alignment, inclination and/or intensity of the generated light sheet.

In further example implementations, the light source can be controlled by means of the control unit in a manner such that, in both operating modes, respectively adapted intensities of the excitation radiation, which is in particular laser radiation, are made available.

In the second operating mode of the microscope, the first cylindrical optical element of the first apparatus and the second cylindrical optical element of the second apparatus are removed from the excitation beam path, the excitation radiation is directed onto the sample in at least one focus, and the focus or the foci can be guided over the sample by means of the scanning apparatus, for example in the manner of a grid.

If the microscope is in the second operating mode, that is to say if the microscope is in the second operating state, detection radiation that is brought about in the illuminated sample by the excitation radiation directed into the focus is guided along a second detection path. A second detector for capturing the detection radiation is present in the second detection path.

Switching between the two operating modes is advantageously possible within a brief time period. For this purpose, the abovementioned means for switching and the drives thereof can be controlled in a coordinated manner by means of the control unit, with the result that switching is effected for example in less than one second.

In a further example implementation of the microscope, in the excitation beam path between the light source and the color splitter, a controllable optical element for influencing the intensity distribution of the excitation radiation can be arranged in the sample space or in the sample. In this case, only the intensity of the excitation radiation is influenced for a respective moment. A modulation of the intensity distribution in the sample space or in the sample then comes about only over a specific time period and a plurality of positions of the excitation radiation, in particular as a consequence of the scanning movement of the scanning apparatus. In other words, a modulation of the spatial intensity distribution comes about by way of the temporal modulation in connection with the scanning operation and the actually incoming intensity of the excitation light depending on the sample position.

In another aspect, a method is provided for operating a microscope having two operating modes. In the first operating mode, provided excitation radiation is shaped in an excitation beam path by being limited in terms of its cross section transversely to the propagation direction of the excitation radiation, that is to say transversely to the optical axis, in a first direction by means of a first cylindrical optical element. This is preferably done by means of a first cylindrical optical element. The excitation radiation thus formed is reflected by means of a reflective element, for example a color splitter, arranged at a tilt angle, wherein the tilt angle brings about a deviation of the reflected excitation radiation from the optical axis. The reflected excitation radiation is shaped by means of a second cylindrical optical element by being extended in terms of its cross section transversely to the propagation direction of the excitation radiation in a second direction orthogonal to the first direction by means of the second cylindrical optical element. The excitation radiation that has been shaped in two directions is radiated into an image-side entry pupil of an objective in a manner not on the optical axis. Owing to light being radiated in outside of the optical axis, an oblique light sheet is generated in an object-side sample space. The excitation radiation brings about, in a sample located in the sample space, detection radiation that is captured using light-field microscopy in a collected manner by means of the objective by virtue of said detection radiation being detected by means of a detector with an upstream microlens array.

In the second operating mode, the microscope has been transferred to a second operating state. For this purpose, the first and the second cylindrical optical element are removed from the excitation beam path, and the excitation radiation is directed onto the sample in at least one focus. The focus or the foci are guided over the sample, in particular, in the manner of a grid. Detection radiation brought about in the sample by the focused excitation radiation is collected by means of the objective and captured in a confocal second detection path.

In a further refinement of the method, the excitation radiation in the excitation beam path is set in the first operating mode by means of an optical element for influencing the intensity distribution of the excitation radiation in a manner such that the generated light sheet has an at least largely uniform intensity distribution in particular along its cross section.

In an example implementation of the method, the image data captured during the first operating mode and during the second operating mode can be evaluated and computationally combined. For example, the image data that have been computationally combined in this way can be combined in a common presentation. Such a refinement makes it possible to combine the advantages of light-field detection and in particular confocal detection with one another and to provide an increased information content for a user. If the image data of the two operating modes are assigned to one another in a suitable manner, they can also be made available for further evaluations.

BRIEF DESCRIPTION OF THE DRAWINGS

The invention is explained in more detail below on the basis of exemplary embodiments and figures. In the figures.

DETAILED DESCRIPTION

Figure 1:
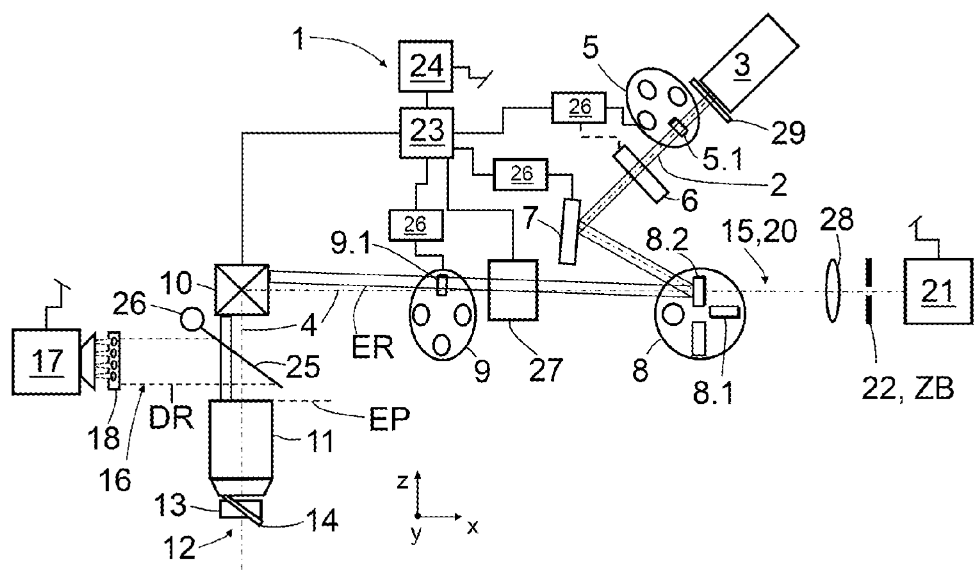
FIG. 1 shows a schematic illustration of a first exemplary embodiment of the microscope in a first operating mode, wherein light-field detection in the Fourier domain takes place.

The basic setup of a microscope 1 is shown schematically in FIG. 1. A light source 3, which is arranged in an excitation beam path 2 of the microscope 1 and is embodied, in particular, in the form of a laser light source 3, emits excitation radiation ER along an optical axis 4 of the excitation beam path 2. In the illustrated first operating state of the microscope 1, in which the microscope 1 is used in a first operating mode, a first apparatus 5 for introducing optical elements into the excitation beam path 2 is present, and a first cylindrical optical element 5.1 in the form of a first cylindrical lens is introduced into the excitation beam path 2. Owing to the effect of the first cylindrical optical element 5.1, the excitation radiation ER is shaped by being limited transversely to the propagation direction of the excitation radiation ER, that is to say transversely to the optical axis 4, in a first direction. In this way, a thickness of a light sheet 14 to be generated is essentially set. Using a stop 6 arranged optionally downstream in the excitation beam path 2, the thickness of the light sheet 14 can be set even more precisely or varied. For this purpose, the stop 6 can be embodied in the form of a settable slit stop, of a wheel or of a slider with different apertures. The thickness of the light sheet 14 is influenced according to which of the available apertures is respectively introduced into the excitation beam path 2. An actuating movement of the stop 6 can be performed by means of a drive 26, which is controllable by way of a control command from a control unit 23.

The shaped excitation radiation travels to an adjustable mirror 7, which reflects the excitation radiation ER onto a color splitter 8. The beam position can be adapted by means of the mirror 7 if, for example, an objective has been changed and the illumination is to be adapted to the pupil boundary that has changed as a result thereof.

Figure 3:
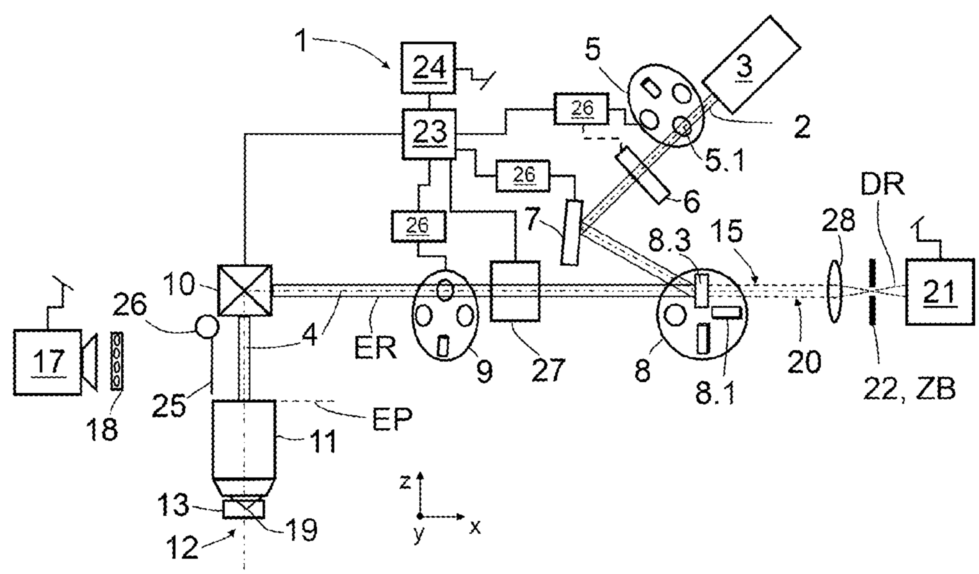
FIG. 3 shows a schematic illustration of a third exemplary embodiment of the microscope in a second operating mode.

The color splitter 8 is reflective to the excitation radiation ER, while it is transparent to detection radiation DR to be captured in a second operating mode (see FIG. 3). The color splitter 8 is embodied as what is known as a color splitter wheel or splitter wheel and can have at least one tilted mirror 8.1, on account of whose effect the excitation radiation ER is reflected at a tilt angle and with a slight deviation from the optical axis 4 along the further excitation beam path 2. Further tilted mirrors 8.2 (of which only a second one is illustrated) can be present on the splitter wheel of the color splitter 8, on account of whose effect the position and/or the direction of the light sheet 14 to be generated can be changed as a result. The splitter wheel furthermore contains a mirror 8.3 without a tilt angle (see also FIG. 4).

The thus reflected excitation radiation ER is incident on a second cylindrical optical element 9.1, which has been introduced by pivoting in a second apparatus 9 for introducing optical elements into the excitation beam path 2. The second cylindrical optical element 9.1 causes a widening of the shaped excitation radiation ER in a second direction orthogonal to the first direction. In other words, a width of the light sheet 14 is set by means of the second cylindrical optical element 9.1.

The excitation radiation ER, more precisely the beam thereof, which has been shaped in the first and the second direction and is focused in each case accordingly in one direction, arrives at a scanning apparatus 10, by means of which the beam of the excitation radiation ER can be diverted in a controlled manner in two directions that are perpendicular to one another (x-y scanner).

For controlling the light source 3, the first apparatus 5, optionally the stop 6 and/or the adjustable mirror 7, the splitter wheel of the color splitter 8, optionally a zoom optical unit 27, the second apparatus 9, the scanning apparatus 10 and a switching element 25, a control unit 23 is present and connected, in a manner that is suitable for exchanging data, to the aforementioned technical units or to drives 26 assigned thereto using data connections. The control unit 23 is additionally connected to an evaluation unit 24, which is configured for evaluating the image data of the first detector 17 and of the second detector 21 and optionally for computationally combining the image data. The evaluation unit 24 and the detectors 17, 21 are connected to one another for the transmission of data (shown in a manner indicated).

The scanning apparatus 10, which is controlled by the control unit 23, diverts the excitation light ER, in particular laser light, in a controlled manner in an x-direction x and/or in a y-direction y (scanning movement). The scanning apparatus 10 can be used to vary the angle of incidence and an entry location of the excitation light ER in an entry pupil EP (objective pupil) of an objective 11 used together for illumination and detection and thus to set the position of the light sheet 14.

The excitation radiation ER is directed into an entry location in the entry pupil EP, which is located not on the optical axis 4 of the objective 11. Due to the entry location and the scanning movement, a light sheet 14 that is inclined relative to the optical axis 4 is produced by the objective 18 on the object side in a correspondingly inclined light sheet plane. If a sample 13 is located in a sample space 12 upstream of the objective 11, the light sheet 14 can be directed into said sample.

Detection radiation DR brought about in the sample 13 is collected by means of the objective 11. This detection radiation DR is steered into a first detection path 16 (illustrated by a dashed line) of a detection beam path 15 owing to the effect of a switching element 25 introduced into the beam path. The switching element 25 is embodied in the form of a dichroic beam splitter and is placed in or removed from the beam path by means of a drive 26. A microlens array 18 is arranged in a pupil in the first detection path 16. The individual microlenses (merely indicated) focus the detection radiation DR that is respectively captured by them into an image plane, in which a number of detector elements (not shown) of a first detector 17 are arranged. The detector elements, which are each optically assigned to a microlens, each capture the image that is recorded by that particular microlens. The image data thus obtained are transmitted to an evaluation unit 24 and evaluated according to the principles of light-field technology in the sense of light-field detection in the Fourier domain.

Between the light source 3 and the color splitter 8, a controllable optical element 29 for influencing the intensity distribution of the excitation radiation ER can optionally be arranged in the sample space 12 or in a sample 13 located therein. The optical element 29 can be controlled for example by means of the control unit 23 and be embodied for example in the form of an AOTF (acousto-optic tunable filter). If, for example, no targeted influencing of the intensity distribution of the excitation radiation ER is required in the second operating mode, which is described further below, the optical element 29 can be brought into a neutral or temporally constant switching state or be removed from the excitation beam path 2. The objective of such influencing of the intensity distribution of the excitation radiation ER is to provide an intensity distribution that is as uniform as possible over the cross section of the light sheet 14 generated as a result of the scanning movement. In particular, the intention here is to at least reduce the effect of the peripheral drop of the intensity profile.

Figure 2:
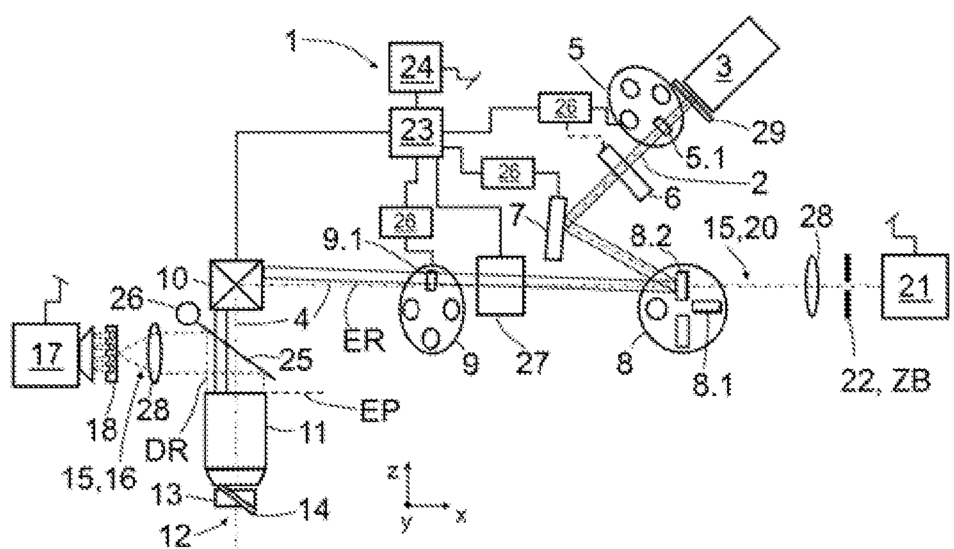
FIG. 2 shows a schematic illustration of a second exemplary embodiment of the microscope in a first operating mode, wherein light-field detection in the spatial domain takes place.

The exemplary embodiment shown in FIG. 2 substantially corresponds to the exemplary embodiment of FIG. 1, except in the first detection path 16, at least one optical lens 28 is located, on account of whose effect the detection radiation DR is focused into a nominal image plane in which the microlens array 18 is located. In this embodiment of the microscope 1, the light-field detection takes place in the spatial domain.

The operating state of the microscope 1 in its second operating mode is shown schematically in FIG. 3. The first apparatus 5 and the second apparatus 9 are set with respect to the excitation beam path 2 such that the excitation radiation ER can pass through an unoccupied position of the respective apparatus 5, 9. In alternative embodiments, the first and the second apparatus 5, 9 can be removed from the excitation beam path 2. The cross section of the beam of the excitation radiation ER is influenced merely by the current size and possibly the shape of the aperture of the stop 6. The color splitter 8 is set in a manner such that a mirror 8.3 is located without a tilt angle in the excitation beam path 2.

In the second operating mode, the excitation radiation ER is reflected starting from the mirror 8.3 along the optical axis 4. If one of the tilted mirrors 8.1, 8.2 of the color splitter 8 should remain in the beam path, a deviation from the optical axis 4 can be compensated for by means of the correspondingly controlled scanning apparatus 10. In the exemplary embodiment illustrated, an optional zoom optical unit 27, which is controllable by the control unit 23, is located between the color splitter 8 and the second apparatus 9.

The excitation radiation ER is directed through the objective 11 into a focus 19, which is deflected in a manner controlled by means of the scanning apparatus 10 in the direction of an x-axis and y-axis of a Cartesian coordinate system, and the sample 13 is thus scanned. The detection radiation DR, brought about in the sample 13 as a result of the focused excitation radiation ER, in turn is collected using the objective 11, is transferred into a stationary beam ("descanned") through the effect of the scanning apparatus 10, and passes, via the second apparatus 9 and the optional zoom optical unit 27, to the color splitter 8, which is transparent to the detection radiation DR. The detection radiation DR is steered into a second detection path 20, which is configured as a confocal detection path.

In this detection path, at least one optical lens 28 is arranged, which focuses the detection radiation DR into an intermediate image plane ZB. In this intermediate image plane ZB, a pinhole 22 is located, which serves to screen off out-of-focus portions of the detection radiation DR. Located downstream of the pinhole 22 is a second detector 21. The image data captured by means of the second detector 21 are transmitted to the evaluation unit 24. In addition, the evaluation unit 24 receives in each case current position data of the scanning apparatus 10 from the control unit 23, with the result that a location of origin in the sample 13 can be assigned in each case to the captured image data.

Figure 4:
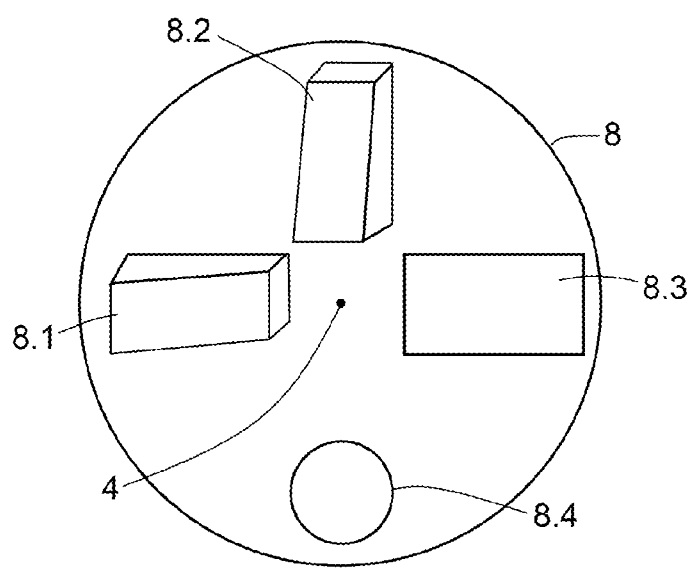
FIG. 4 shows a schematic detailed illustration of a color splitter in the form of a filter wheel with different optical elements.

FIG. 4 schematically shows the color splitter 8 in an embodiment as a (color) splitter wheel. At the four positions illustrated, a first tilted mirror 8.1, a second tilted mirror 8.2, a mirror 8.3 without tilt angle and a free position 8.4 are arranged around the optical axis 4. The first tilted mirror 8.1 has a tilt angle of 0.5°, while the second tilted mirror 8.2 has a tilt angle of −0.5°. The beam of the excitation radiation ER is thus deflected in an opposite direction by the second tilted mirror 8.2 than takes place with the first tilted mirror 8.1. The mirror 8.3 does not have any tilt angles and reflects excitation radiation ER substantially along the optical axis 4.

The invention claimed is:

1. A microscope comprising:

an excitation beam path;

a light source for providing excitation radiation (ER) in the excitation beam path;

a color splitter in the excitation beam path, wherein the color splitter is reflective to the excitation radiation (ER) and on account of whose effect a beam of the excitation radiation (ER) is reflected further along the excitation beam path;

a scanning apparatus configured for controlling a deflection of the excitation radiation (ER);

an objective in the excitation beam path configured for illuminating a sample located in a sample space with the excitation radiation (ER) and configured for capturing detection radiation (DR) brought about by means of the excitation radiation (ER);

a first apparatus configured for introducing optical elements into the excitation beam path, wherein the first apparatus is located in the excitation beam path between the light source and the color splitter, and wherein, in a first operating mode of the microscope, a first cylindrical optical element is introduced into the excitation beam path by the first apparatus;

a second apparatus configured for introducing optical elements into the excitation beam path, wherein the second apparatus is located in the excitation beam path between the color splitter and the scanning apparatus, and wherein, in the first operating mode of the microscope, a second cylindrical optical element is introduced into the excitation beam path by the second apparatus; and a means for switching the microscope between the first operating mode and a second operating mode in which the first and second cylindrical optical elements are not introduced into the excitation path.

2. The microscope according to claim 1, further comprising a settable stop located in the excitation beam path between the first apparatus and the color splitter.

3. The microscope according to claim 1, further comprising an adjustable mirror located in the excitation beam path and upstream of the color splitter, wherein the adjustable mirror is configured to steer the excitation radiation (ER) is steered onto the color splitter.

4. The microscope according to claim 1, wherein the color splitter includes a mirror that is inclined by a tilt angle, wherein the tilt angle results in a deviation of the beam of the reflected excitation radiation (ER) from an optical axis of the microscope.

5. The microscope according to claim 1, further comprising a first detector located in a first detection path, the first detector having an upstream microlens array with a number of microlenses, wherein the first detector is configured to receive the detection radiation (DR) and, wherein each microlens is optically assigned a number of detector elements of the first detector, such that, in addition to a piece of spatial information of the origin of the detection radiation (DR), a plurality of pieces of angle information of the detection radiation (DR) can also be captured.

6. The microscope according to claim 1, wherein the scanning apparatus is configured to deflect reflected excitation radiation (ER) of the microscope in a controlled manner.

7. The microscope according to claim 6, wherein, in the second operating mode, the first cylindrical optical element of the first apparatus and the second cylindrical optical element of the second apparatus are removed from the excitation beam path, wherein the excitation radiation (ER) is directed onto the sample in at least one focus, and wherein the scanning apparatus is configured to guide the focus over the sample.

8. The microscope according to claim 6, further comprising a second detector configured for capturing the detection radiation (DR) that is brought about in the sample by the excitation radiation (ER) when the microscope is in the second operating mode, the second detector being located in a second detection path.

9. The microscope according to claim 1, further comprising a controllable optical element configured for influencing an intensity distribution of the excitation radiation (ER) that is deflected in a controlled manner by means of the scanning apparatus into the sample, wherein the controllable optical element is located between the light source and the color splitter.

10. A method of operating a microscope in a first operating mode and in a second operating mode, the method comprising:

in the first operating mode:

shaping excitation radiation (ER) in an excitation beam path with a first cylindrical optical element to limit a cross section of the excitation radiation in a first direction transverse to a propagation direction of the excitation radiation (ER) in a first direction;

reflecting the shaped the excitation radiation (ER) by means of a reflective element arranged at a tilt angle, wherein the tilt angle brings about a deviation of the reflected excitation radiation (ER) from an optical axis of the microscope;

shaping the reflected excitation radiation (ER) by means of a second cylindrical optical element such that a cross section of the shaped and reflected excitation radiation is extend in a second direction transverse to the propagation direction of the excitation radiation (ER), wherein the second direction is orthogonal to the first direction;

radiating the excitation radiation (ER) that has been shaped by the first and second cylindrical optical elements onto an image-side entry pupil (EP) of an objective in a manner not on the optical axis, such that an oblique light sheet is thereby generated in an object-side sample space; and collecting, by means of the objective, detection radiation (DR) brought about by the excitation radiation (ER) in a sample that is located in the sample space, wherein the collected detection radiation (DR) is captured in a first detection path using light-field microscopy by means of a detector having an upstream microlens array;

and, in the second operating mode, in which the first and the second cylindrical optical elements are removed from the excitation beam path:

directing the excitation radiation (ER) onto the sample in at least one focus;

guiding the focus over the sample in the manner of a grid; and collecting the detection radiation (DR) brought about in the sample by the focused excitation radiation (ER) by means of the objective, wherein the collected detection radiation (DR) is captured in a confocal second detection path.

11. The method according to claim 10, further comprising:

in the first operating mode, controlling an intensity distribution of the excitation radiation (ER) in the excitation beam path by means of an optical element such that the generated light sheet has a uniform intensity distribution in particular along its cross section.

12. The method according to claim 10, further comprising:

in the first operating mode and in the second operating mode, generating capturing image data from the collected detection radiation, and evaluating and computationally combining the captured image data.

* * * * *